US007804841B2

(12) United States Patent
Shih

(10) Patent No.: US 7,804,841 B2
(45) Date of Patent: Sep. 28, 2010

(54) METHOD AND COMMUNICATION APPARATUS FOR DECIDING A TRANSMITTING REGION FOR AN ALLOCATED TRANSMITTING BURST IN A FRAME OF AN OFDMA SYSTEM

(75) Inventor: Chih-Heng Shih, Taichung (TW)

(73) Assignee: Mediatek Inc., Hsinchu (TW)

( * ) Notice: Subject to any disclaimer, the term of this patent is extended or adjusted under 35 U.S.C. 154(b) by 663 days.

(21) Appl. No.: 11/838,394

(22) Filed: Aug. 14, 2007

(65) Prior Publication Data
US 2008/0075042 A1 Mar. 27, 2008

Related U.S. Application Data

(60) Provisional application No. 60/826,750, filed on Sep. 25, 2006.

(51) Int. Cl.
*H04J 4/00* (2006.01)
(52) U.S. Cl. ........................ 370/436; 370/437
(58) Field of Classification Search .......... 370/330, 370/336, 344, 431, 436, 445, 437, 462
See application file for complete search history.

(56) References Cited

U.S. PATENT DOCUMENTS 7,174,456 B1 * 2/2007 Henry et al. ............... 713/158

2005/0107036 A1 * 5/2005 Song et al. ................. 455/23
2006/0153112 A1 * 7/2006 Lim et al. .................. 370/310

OTHER PUBLICATIONS

Chinese OA dated Nov. 13, 2009 from related Chinese Application No. 200710161746.0 with English translation.
"IEEE Standard for Local and metropolitan area networks Part 16: Air Interface for Fixed and Mobile Broadband Wireless Access Systems Amendment 2: Physical and Medium Access Control Layers for Combined Fixed and Mobile Operation in Licensed Bands and Corrigendum 1", IEEE Computer Society and the IEEE Microwave Theory and Techniques Society, IEEE Std. 802. 16c-2005 and IEEE Std 802. 16-2004/Cor1-2005, 353-362, Feb. 28, 2006.
"Changes on Downlink and Uplink Resource Allocation in OFDMA-PHY", Chulsik Yoond, IEEE C802. 16c-04/07, 0-9, Jan. 4, 2004.

* cited by examiner

*Primary Examiner*—Brenda Pham
(74) *Attorney, Agent, or Firm*—Grossman, Tucker, Perreault & Pfleger, PLLC

(57) ABSTRACT

A method and a communication apparatus for deciding a transmitting region for an allocated transmitting burst in a frame of an orthogonal frequency division multiplex access (OFDMA) system are provided. The communication apparatus comprises a decoder and a processing unit. The decoder decodes an MAP message, which is related to the allocated transmitting burst, into a plurality of parameters. The processing unit assigns a plurality of burst regions in the frame according to the parameters and decides a transmitting region according to the burst regions.

18 Claims, 7 Drawing Sheets

METHOD AND COMMUNICATION APPARATUS FOR DECIDING A TRANSMITTING REGION FOR AN ALLOCATED TRANSMITTING BURST IN A FRAME OF AN OFDMA SYSTEM

CROSS-REFERENCES TO RELATED APPLICATIONS

This application claims the benefit of Provisional Application Ser. No. 60/826,750 filed on Sep. 25, 2006.

BACKGROUND OF THE INVENTION

1. Field of the Invention

The present invention relates to a method and a communication apparatus for deciding a transmitting region for an allocated transmitting burst in a frame of an orthogonal frequency division multiplex access (OFDMA) system according to a plurality of burst regions.

2. Descriptions of the Related Art

The use of broadband services has increased with the rapid development of computer networks. However, only computer users in some areas of the world can obtain high-speed wired broadband services, such as digital subscribe line (DSL), cable broadband accessing service, etc. While network telecommunication service providers would like to expand the availability range of their broadband networks, the high construction costs for building wired networks prevents them from doing so. Therefore, developing wireless broadband network technologies has become a viable alternative. Present wireless network technologies include wide area network (WAN), metropolitan area network (MAN), local area network (LAN), and personal area network (PAN). Each technology applies to its own communication distance.

The IEEE 802.16e, or WiMAX, is a new wireless transmission standard which was initially established for metropolitan area network to provide the "last mile" wireless broadband connection technology. After improvements, the IEEE 802.16e can also support other market needs, such as various mobile and high-speed broadband applications. In contrast with the IEEE 802.11 (Wi-Fi) and 3G mobile communication technology, the IEEE 802.16e has a greater network broadband, lower building costs, better service quality, and better expansibility. Furthermore, it can assist and expand on Wi-Fi hot points.

A conventional OFDMA wireless communication system 1 based on the IEEE 802.16e is illustrated in FIG. 1. The OFDMA wireless communication system 1 comprises a base station (BS) 101 and a plurality of mobile stations (MSs) 103, 105, 107, 109. For brevity, the MSs will be denoted hereinafter as the first MS 103, second MS 105, third MS 107, and fourth MS 109. There are a plurality of frames used to transmit information and/or data between the BS 101 and the MSs 103~109 in the OFDMA wireless communication system 1 as illustrated in FIG. 2. For brevity, the frames will be denoted hereinafter as frames 21, 23, 25. The frames 21, 23, 25 are allocated by a wireless communication apparatus, such as the BS 101. The x-axis in FIG. 2 represents the symbol axis, while the y-axis represents the sub-channel axis.

The frames 21, 23, 25 of the OFDMA wireless communication system 1 respectively comprise downlink sub-frames 211, 231, 251 and uplink sub-frames 213, 233, 253. Each of these sub-frames can be used for downlinking (BS to MSs) or uplinking (MSs to BS) information/data transmission to the OFDMA wireless communication system 1. In addition, each of the downlink sub-frames 211, 231, 251 respectively comprise Uplink-MAPs 2111, 2311, 2511, which are uplink bursts allocated by slots to different MSs 103~109. Each of the uplink sub-frames 213, 233, 253 respectively comprises some control regions, such as ranging sub-channel regions or fast feedback regions.

In more detail, the Uplink-MAP 2111 of the downlink sub-frame 211 will allocate the following: an uplink burst 2333 with slots of the first MS 103, an uplink burst 2334 with slots of the second MS 105, an uplink burst 2335 with slots of the third MS 107, and an uplink burst 2336 with slots of the fourth MS 109. These uplink bursts will be allocated in the uplink sub-frame 233 using different information elements (not shown), aside from the ranging sub-channel 2331 and the fast feedback 2332. The information element of the first MS 103 in the Uplink-MAP 2111 allocates a sub-channel offset, a symbol offset, and a number of slots of the uplink burst 2333, while the information element of the second MS 105 in the Uplink-MAP 2111 allocates a sub-channel offset, a symbol offset, and a number of slots of the uplink burst 2334. Likewise, the information element of the third MS 107 in the Uplink-MAP 2111 allocates a sub-channel offset, a symbol offset, and a number of slots of the uplink burst 2335; while the information element of the fourth MS 109 in the Uplink-MAP 2111 allocates a sub-channel offset, a symbol offset, and a number of slots of the uplink burst 2336. Finally, the uplink bursts 2333~2336 of the uplink sub-frame 233 can be described by the above specification and can be respectively transmitted with the allocated slots by each baseband processor of the MSs 103~109.

In the same way, the Uplink-MAP 2311 of the downlink sub-frame 231 will allocate uplink bursts with slots of the MSs 103~109 in the uplink sub-frame 253, and the Uplink-MAP 2511 of the downlink sub-frame 251 will allocate uplink bursts with slots of the MSs 103~109 in the uplink sub-frame of the next frame (not shown).

With the information elements described above, uplink bursts of the MSs 103~109 will be allocated in each uplink sub-frame for transmitting information/data from the MSs 103~109 to BS 101. However, when the number of the MSs increases, the calculating time of allocating slots for each MS increases as well, thereby, reducing the transmitting efficiency of the OFDMA wireless communication system 1. Accordingly, it is important for the mobile communication providers and the mobile communication apparatus manufacturers to find a solution for improving the calculation time of allocating slots for each MS to increase the transmitting efficiency of the wireless communication system.

SUMMARY OF THE INVENTION

One objective of this invention is to provide a method for deciding a transmitting region for an allocated transmitting burst in a frame of an OFDMA system. The method comprises the following steps: decoding an MAP message into a plurality of parameters, the MAP message relating to the allocated transmitting burst; assigning a first burst region in the frame according to the parameters; assigning a second burst region in the frame according to the parameters; and deciding the transmitting region according to the first burst region and the second burst region.

Another objective of this invention is to provide a communication apparatus for deciding a transmitting region for an allocated transmitting burst in a frame of an OFDMA system. The communication apparatus comprises a decoder and a processing unit. The decoder decodes an MAP message into a plurality of parameters and the MAP message relates to the allocated transmitting burst. The processing unit assigns a first burst region and a second burst region in the frame according to the parameters, and decides the transmitting region according to the first and second burst regions.

Another objective of this invention is to provide a method for deciding the transmitting region for an allocated transmitting burst in the frame of an OFDMA system. The method comprises the following steps: decoding the MAP message, which is related to the allocated transmitting burst, into a plurality of parameters; determining one or more necessary burst regions according to the parameters; and deciding the transmitting region by merging one or more necessary burst regions. The MAP message is used to indicate the slot allocations for at least one of the mobile stations in an uplink sub-frame and is stored in a downlink sub-frame. The plurality of parameters comprises a first slot location, a number of allocated slots, and an uplink sub-frame symbol duration of the transmitting region. Each of the necessary burst regions comprises a symbol offset, a sub-channel offset, a number of symbols, and a number of sub-channels according to the parameters.

A further objective of this invention is to provide a method for deciding a transmitting region for an allocated transmitting burst in a frame of an OFDMA system. The method comprises the following steps: decoding the MAP message, which is related to the allocated transmitting burst, into a plurality of parameters; determining a desired burst region according to the parameters; determining one or more unnecessary burst regions according to the parameters; and deciding the transmitting region by subtracting one or more unnecessary burst regions from the desired burst region. The MAP message indicates the slot allocations for at least one of the mobile stations in an uplink sub-frame and is stored in a downlink sub-frame. The plurality of parameters comprises a first slot location, a number of allocated slots, and an uplink sub-frame symbol of the transmitting region. Each unnecessary burst regions comprises a symbol offset, a sub-channel offset, a number of symbols, and a number of sub-channels according to the parameters.

By satisfying these objectives, the present invention determines a transmitting region of an MS with allocated slots in a frame according to a plurality of burst regions. Accordingly, the calculation time of the allocating slots for each MS can be improved so that the transmitting efficiency of the wireless communication system can be increased.

The detailed technology and preferred embodiments implemented for the subject invention are described in the following paragraphs accompanying the appended drawings for people skilled in the art to well appreciate the features of the claimed invention.

DESCRIPTION OF THE PREFERRED EMBODIMENT

The IEEE 802.16e standard is a standard that is based on the IEEE 802.16 standard and that further comprises an OFDMA wireless communication system of the present invention.

Figure 1:
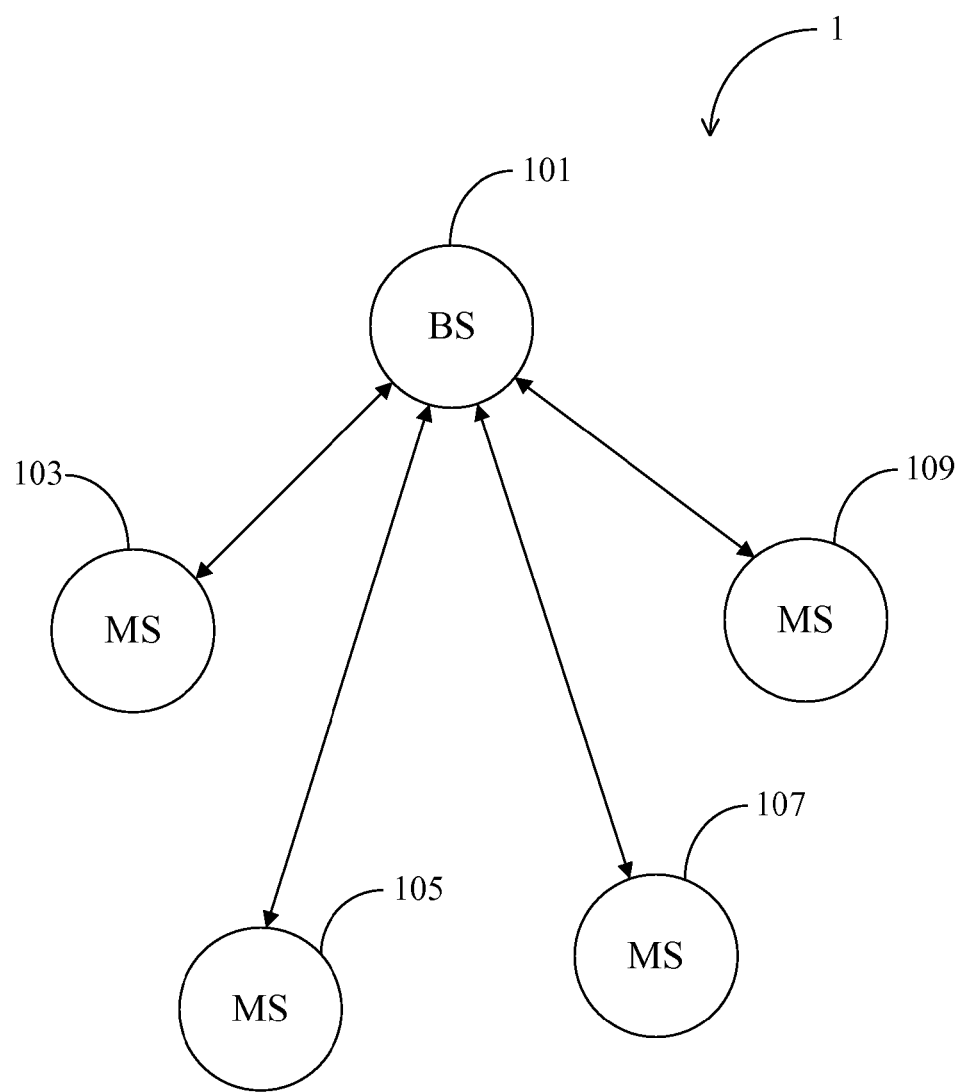
FIG. 1 is a schematic diagram illustrating a conventional OFDMA wireless communication system based on the IEEE 802.16e.
Figure 2:
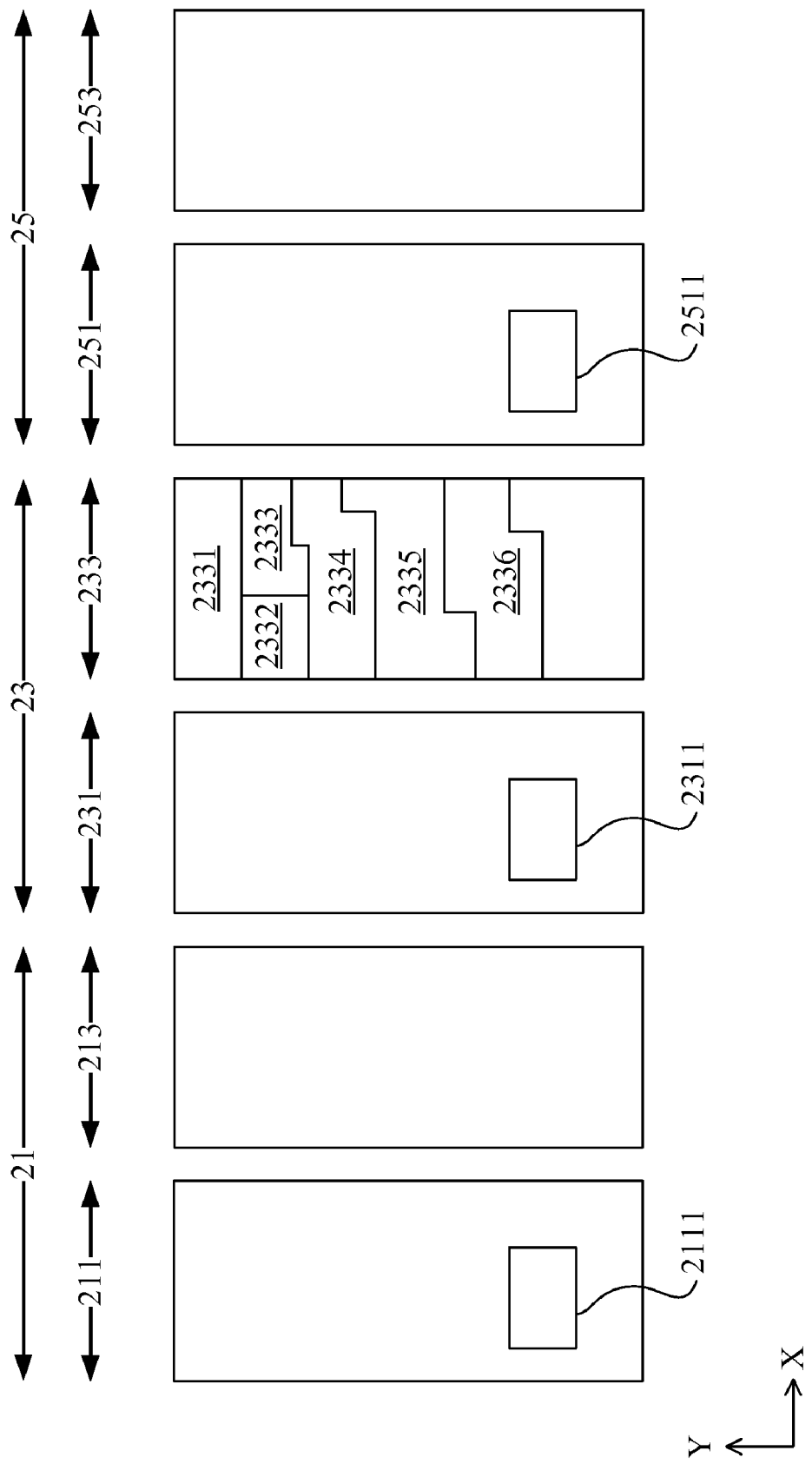
FIG. 2 is a schematic diagram illustrating a plurality of frames used to transmit information and/or data in the conventional OFDMA wireless communication system.
Figure 3:
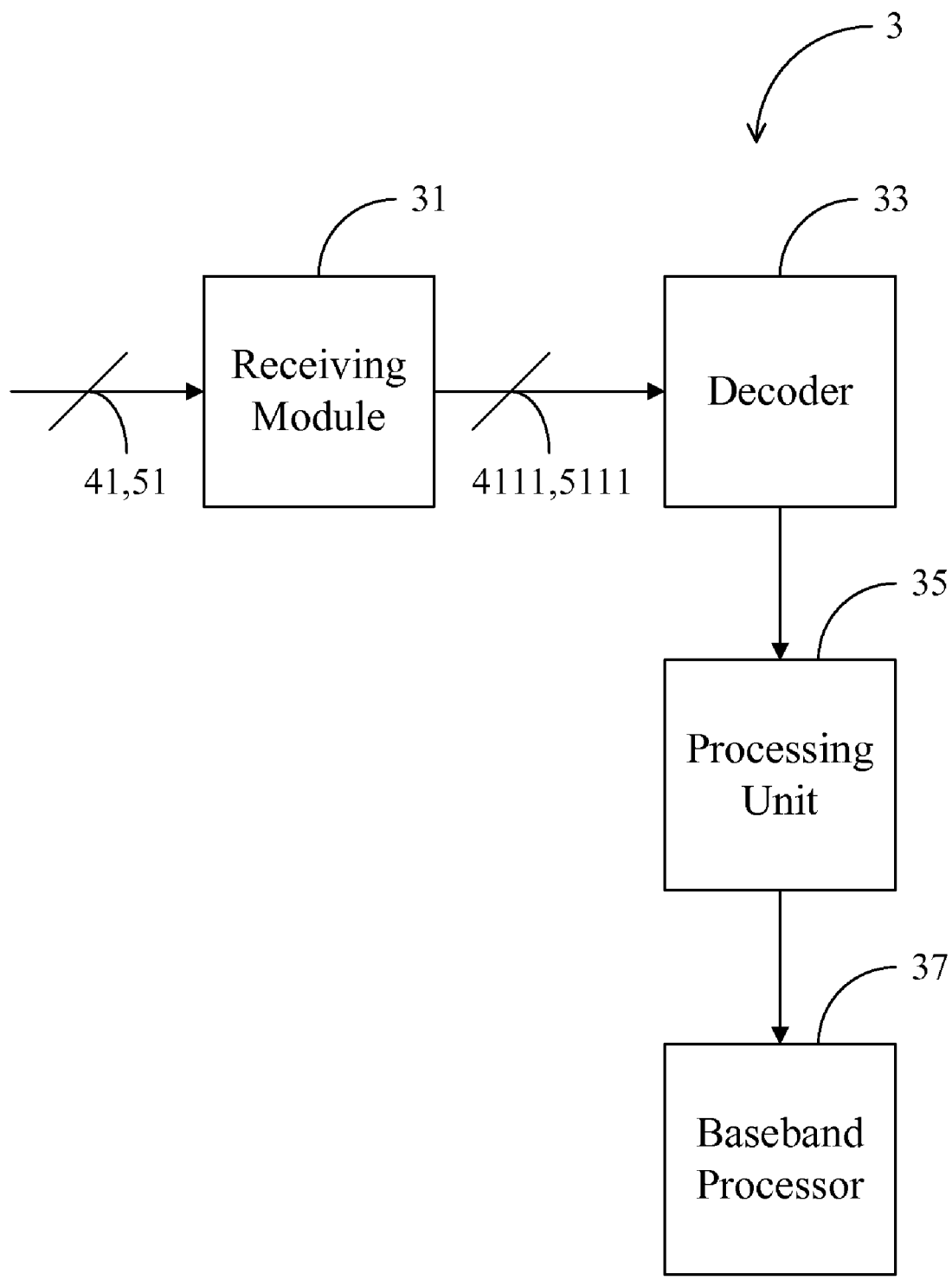
FIG. 3 is a schematic diagram illustrating a communication apparatus of a first embodiment of the present invention.
Figure 4:
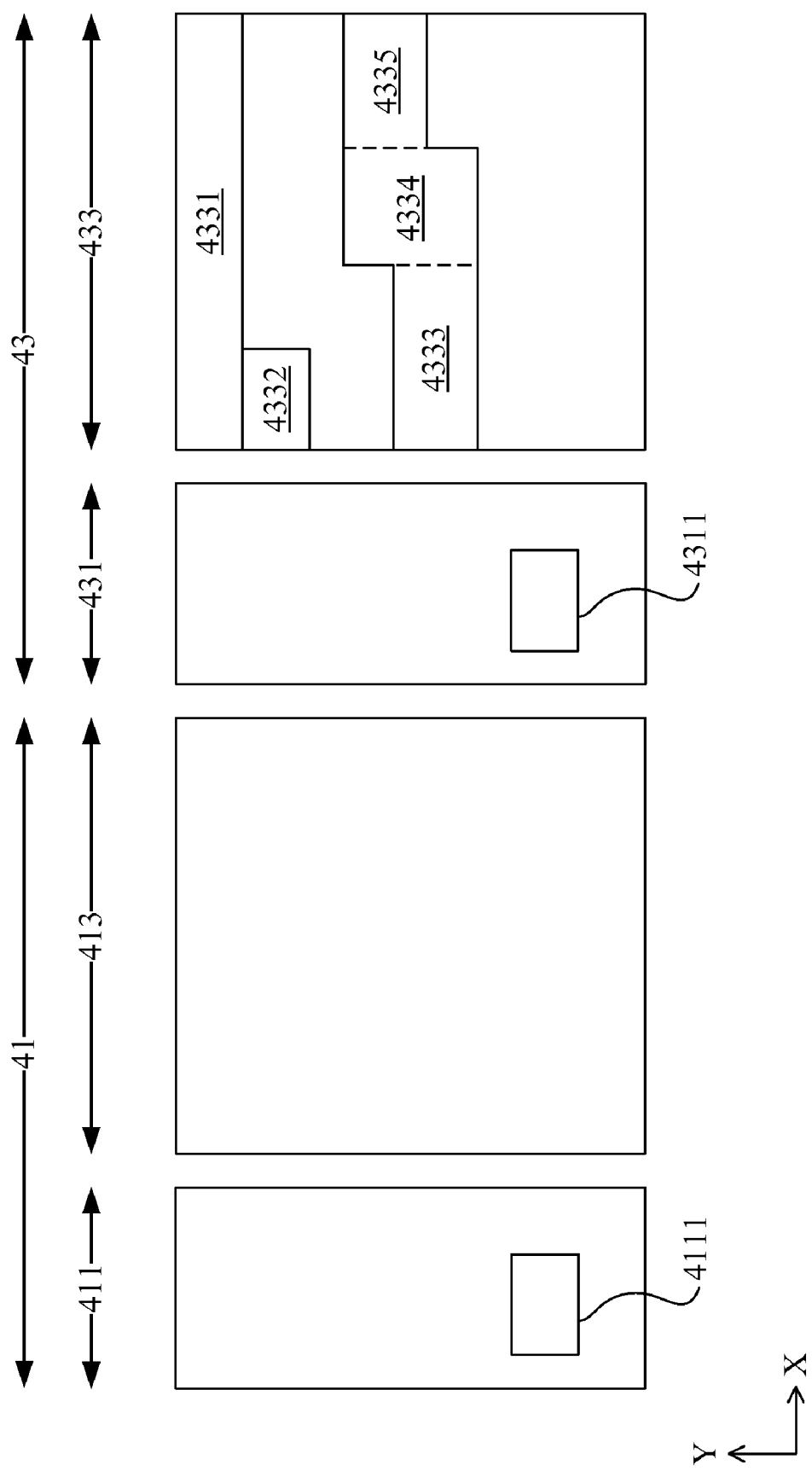
FIG. 4 is a schematic diagram illustrating a plurality of frames used to transmit information and/or data in the OFDMA wireless communication system of the first embodiment.

A first embodiment of the present invention is a communication apparatus for deciding a transmitting region for an allocated transmitting burst in a frame of an OFDMA wireless communication system. The OFDMA wireless communication system 1 is illustrated in FIG. 1, which comprises a BS 101 and a plurality of MSs 103, 105, 107, 109. For brevity, the MSs will be denoted hereinafter as the first MS 103, second MS 105, third MS 107, and fourth MS 109. As illustrated in FIG. 3, the communication apparatus 3, such as the MS 105, comprises a receiving module 31, a decoder 33, a processing unit 35, and a baseband processor 37. There are a plurality of frames used to transmit information and/or data between the BS 101 and the MSs 103~109 in the OFDMA wireless communication system 1 as illustrated in FIG. 4. For brevity, the frames will be denoted hereinafter as the frames 41, 43. The frames 41, 43 are allocated by a wireless communication apparatus, such as the BS 101. The x-axis in FIG. 4 represents the symbol axis, while the y-axis represents the sub-channel axis.

The frames 41, 43 of the OFDMA wireless communication system 1 respectively comprise downlink sub-frames 411, 431 and uplink sub-frames 413, 433. Each of these sub-frames can be used for downlink (BS to MSs) or uplink (MSs to BS) information/data transmission in the OFDMA wireless communication system 1. In addition, each of the downlink sub-frames 411, 431 respectively Uplink-MAPs 4111, 4311 to describe uplink bursts which are allocated by the slots of different MSs 103~109. Each of the uplink sub-frames 413, 433 respectively comprises some control regions, such as the ranging sub-channel region 4331 or fast feedback region 4332.

After the MS 105 receives the frame 41, the receiving module 31 transmits the Uplink-MAP 4111 to the decoder 33. The decoder 33 decodes the Uplink-MAP 4111 into a plurality of parameters and transmits the slots that allocate information, including the first slot location, the number of allocated slots and the uplink sub-frame symbol duration, of the transmitting region into the uplink sub-frame 433. Then, the decoder 33 transmits the parameters and slots allocation information to the processing unit 35.

In one case, the transmitting region with slots of the MS 105 is described by three burst regions 4333, 4334, 4335. The processing unit 35 decides the first symbol offset, first sub-channel offset, first number of symbols, and first number of sub-channels to assign the first burst region 4333. In addition, the processing unit 35 also decides the second symbol offset, second sub-channel offset, second number of symbols, and second number of sub-channels to assign the second burst region 4334. The processing unit 35 decides the third symbol offset, third sub-channel offset, third number of symbols, and third number of sub-channels to assign the third burst region 4335. Finally, the processing unit 35 decides the transmitting region by merging the first burst region 4333, second burst region 4334, and third burst region 4335. The baseband processor 37 uses the transmitting region of the MS 105 to transmit information/data from the MS 105 to the BS 101 after receiving the transmitting region.

Figure 5:
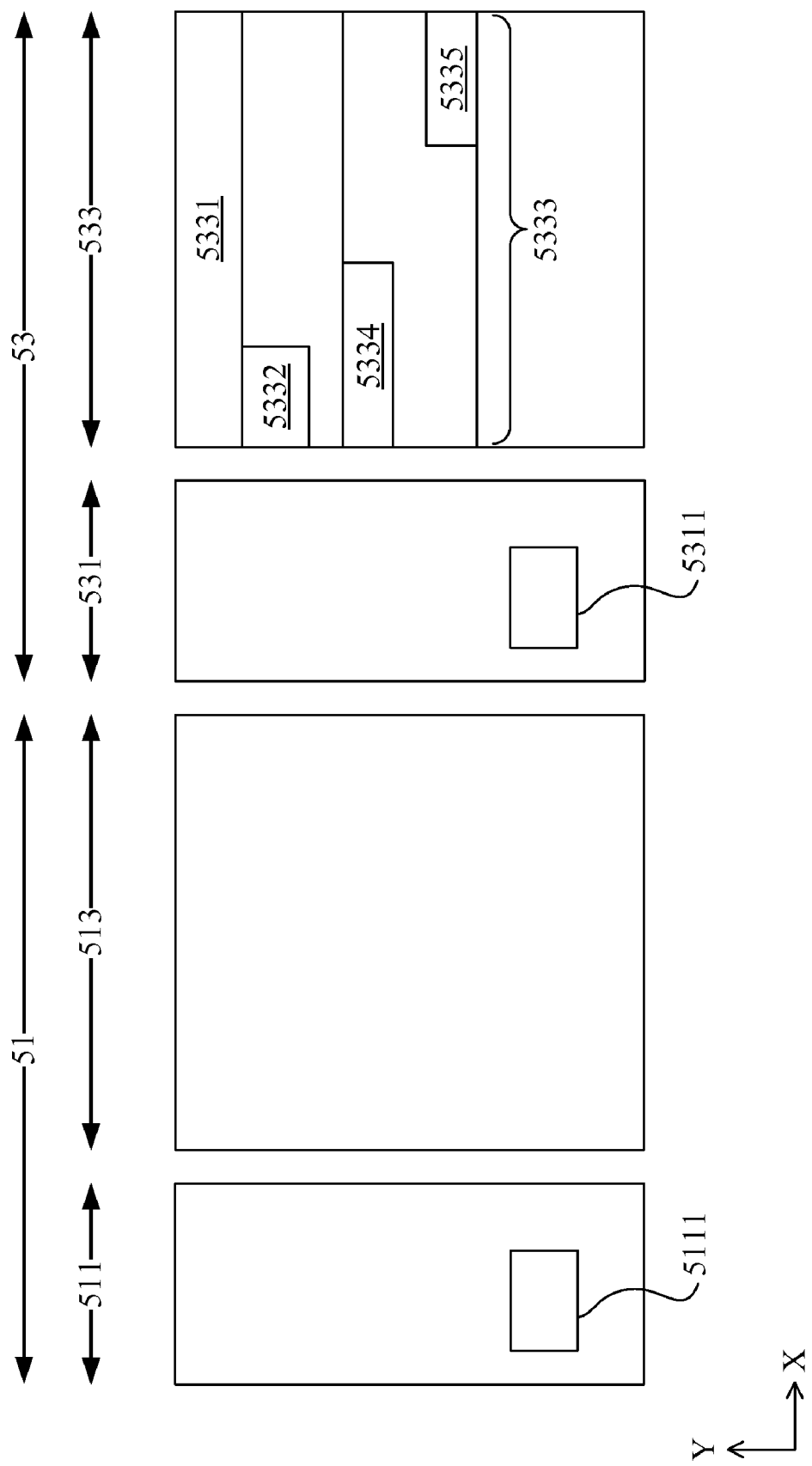
FIG. 5 is a schematic diagram illustrating another plurality of frames used to transmit information and/or data in the OFDMA wireless communication system of the first embodiment.

In another case of the first embodiment, there are a plurality of frames used to transmit information and/or data between the BS 101 and the MSs 103~109 in the OFDMA wireless communication system 1 as illustrated in FIG. 5. For brevity, the frames will be denoted hereinafter as the frames 51, 53. The frames 51, 53 are allocated by a wireless communication apparatus, such as the BS 101. The x-axis in FIG. 5 represents the symbol axis, while the y-axis represents the sub-channel axis.

The frames 51, 53 of the OFDMA wireless communication system 1 respectively comprise downlink sub-frames 511, 531 and uplink sub-frames 513, 533. Each of these sub-frames can be used for downlink (BS to MSs) or uplink (MSs to BS) information/data transmission in the OFDMA wireless communication system 1. In addition, each of the downlink sub-frames 511, 531 respectively comprise Uplink-MAPs 5111, 5311 to describe uplink bursts, which are allocated by slots, to different MSs 103~109. Each of the uplink sub-frames 513, 533 respectively comprises some control regions, such as a ranging sub-channel region 5331 or fast feedback region 5332.

For example, the transmitting region with slots of the MS 105 is described by three burst regions 5333, 5334, 5335. The processing unit 35 decides the desired symbol offset, desired sub-channel offset, desired number of symbols, and desired number of sub-channels to assign the desired burst region 5333. In addition, the processing unit 35 also decides the first symbol offset, first sub-channel offset, first number of symbols, and first number of sub-channels to assign the first burst region 5334. Then, the processing unit 35 decides the second symbol offset, second sub-channel offset, second number of symbols, and second number of sub-channels to assign the second burst region 5335. Finally, the processing unit 35 decides the transmitting region by subtracting the first burst region 5334 and the second burst region 5335 from the desired burst region 5333. The baseband processor 37 uses the transmitting region of the MS 105 to transmit information/data from the MS 105 to the BS 101 after receiving the transmitting region.

Even though the transmitting region of the MS 105 can be decided by subtracting the first burst region 5334 and the second burst region 5335 from the desired burst region 5333, if one of the control regions covers the desired burst region 5333, the transmitting region of the MS 105 is decided by further subtracting one of the covered control regions from the desired burst region 5333. Those skilled in the art can understand the corresponding operations of the subtracting by looking at the above description; thus, no unnecessary detail is given.

A second embodiment of the invention provides a method for deciding a transmitting region for an allocated transmitting burst in a frame of an OFDMA wireless communication system. The method applied to a communication apparatus, such as the MS 105, is as described in the first embodiment. The corresponding flow chart is shown in FIG. 6.

First, step 601 is executed for decoding an MAP message into a plurality of parameters, wherein the MAP message relates to the allocated transmitting burst. Next, step 603 is executed for determining one or more necessary burst regions according to the parameters. Finally, step 605 is executed for deciding the transmitting region by merging one or more necessary burst regions.

Figure 6:
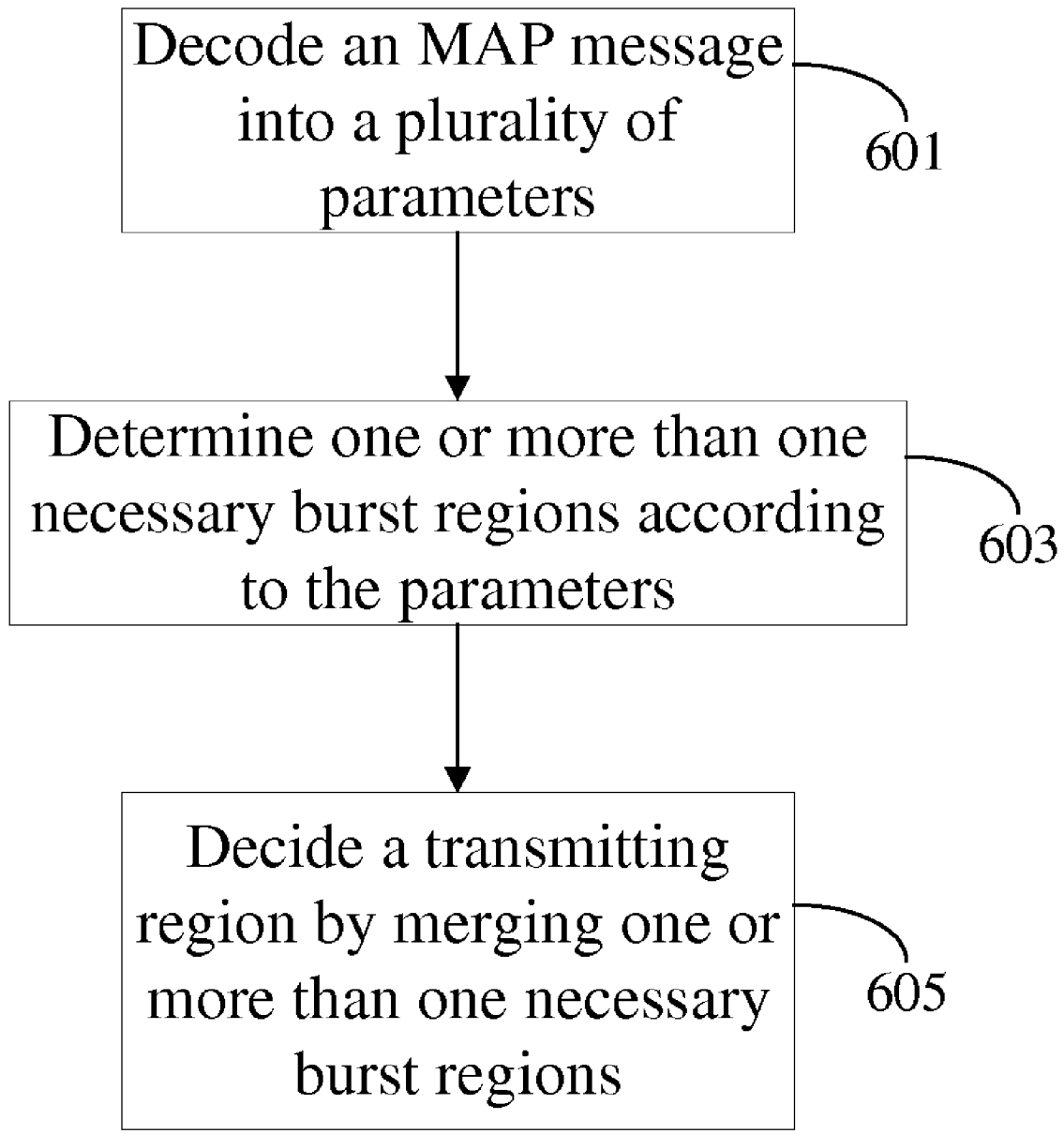
FIG. 6 is a flow chart of a second embodiment of the present invention.

In addition to the steps shown in FIG. 6, the second embodiment can also execute all the operations of the first embodiment. Those skilled in the art can understand the corresponding steps and operations of the second embodiment by looking at those in the first embodiment; thus, no unnecessary detail is given.

A third embodiment of the invention provides a method for deciding a transmitting region for an allocated transmitting burst in a frame of an OFDMA wireless communication system. The method applied to a communication apparatus, such as the MS 105, is as described in the first embodiment. The corresponding flow chart is shown in FIG. 7.

First, step 701 is executed for decoding an MAP message into a plurality of parameters, wherein the MAP message relates to the allocated transmitting burst. Next, step 703 is executed for determining a desired burst region according to the parameters. Then, step 705 is executed for determining one or more unnecessary burst regions according to the parameters. Finally, step 707 is executed for deciding the transmitting region by subtracting one or more unnecessary burst regions from the desired burst region.

Figure 7:
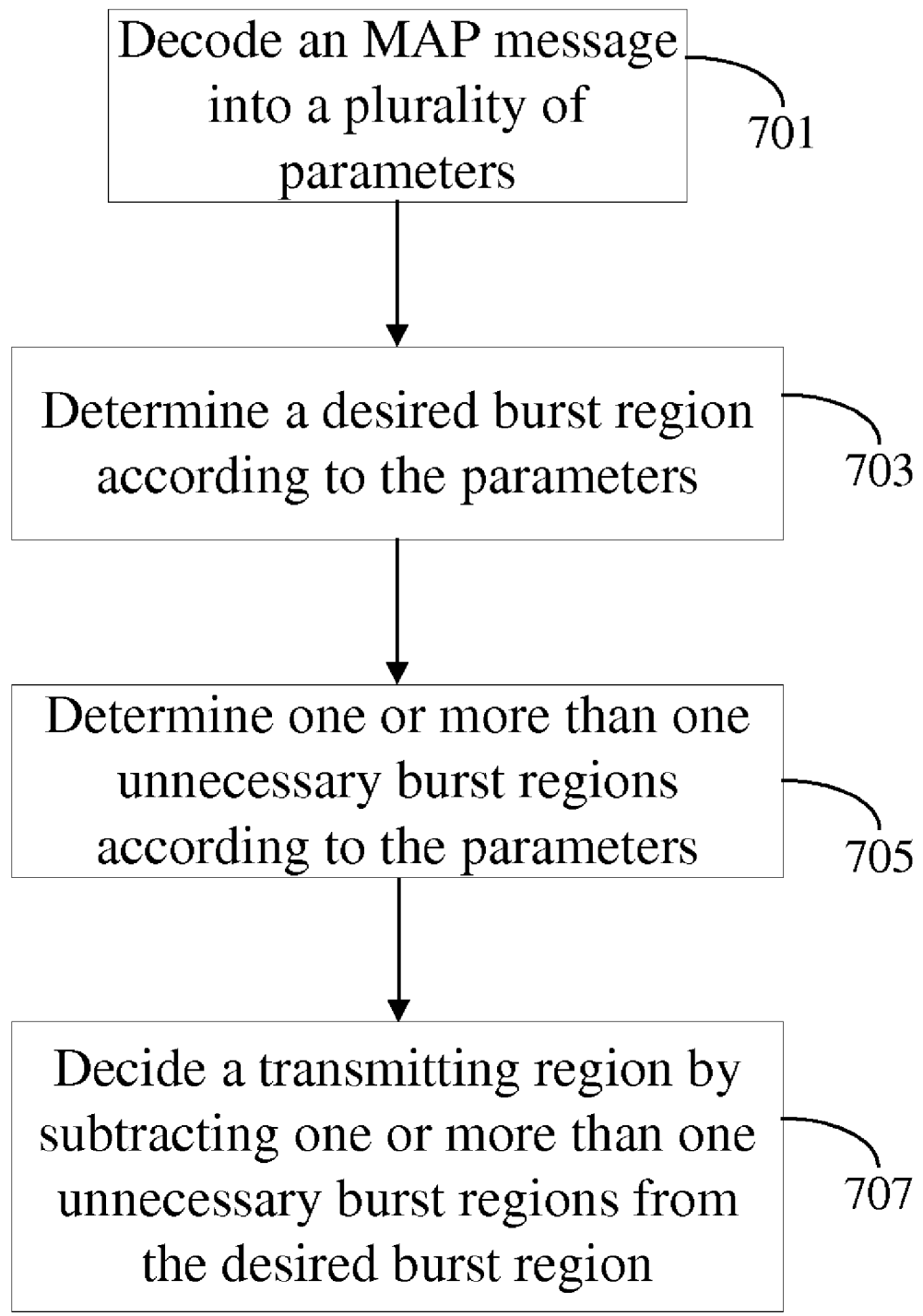
FIG. 7 is a flow chart of a third embodiment of the present invention.

In addition to the steps shown in FIG. 7, the third embodiment can also execute all the operations of the first embodiment. Those skilled in the art can understand the corresponding steps and operations of the third embodiment by looking at those in the first embodiment; thus, no unnecessary detail is given.

According to the aforementioned descriptions, the present invention provides a new method for deciding a transmitting region with allocated slots of an MS in a frame according to a plurality of burst regions. The burst regions can be merged or subtracted from each other to decide the transmitting region. Accordingly, the calculation time of allocating slots for each MS can be improved so that the transmitting efficiency of the wireless communication system can be increased.

The above disclosure is related to the detailed technical contents and inventive features thereof. People skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for deciding a transmitting region for an allocated transmitting burst in a frame of an orthogonal frequency division multiplex access (OFDMA) system, comprising:

decoding via a decoder, an MAP message into a plurality of parameters, the MAP message relating to the allocated transmitting burst;

assigning a first burst region in the frame according to the parameters;

assigning a second burst region in the frame according to the parameters; and deciding the transmitting region according to the first burst region and the second burst region, wherein the MAP message comprises slots allocation information for at least one of mobile stations in an uplink sub-frame and is stored in a downlink sub-frame.

2. The method as claimed in claim 1, wherein the allocated transmitting burst is formed by a plurality of slots.

3. The method as claimed in claim 1, wherein the slots allocation information for at least one of mobile stations is to indicate the number of slots allocated for each of the mobile stations in the uplink sub-frame.

4. The method as claimed in claim 3, wherein the plurality of parameters comprises a first slot location, a number of allocated slots, and an uplink sub-frame symbol duration of the transmission region.

5. The method as claimed in claim 4, wherein the step of assigning the first burst region comprises the step of:
deciding a first symbol offset, a first sub-channel offset, a first number of symbols, and a first number of sub-channels of the first region according to the parameters.

6. The method as claimed in claim 5, wherein the step of assigning the second burst region comprises the step of:
deciding a second symbol offset, a second sub-channel offset, a second number of symbols, and a second number of sub-channels of the second region according to the parameters.

7. The method as claimed in claim 1, wherein the deciding step comprises a step of merging the first burst region and the second burst region.

8. The method as claimed in claim 1, wherein the deciding step comprises a step of subtracting the second burst region from the first burst region.

9. A communication apparatus for deciding a transmitting region for an allocated transmitting burst in a frame of an OFDMA system, comprising:
a decoder for decoding an MAP message into a plurality of parameters, the MAP message relating to the allocated transmitting burst; and
a processing unit for assigning a first burst region and a second burst region in the frame according to the parameters and deciding the transmitting region according to the first burst region and the second burst region,
wherein the MAP message comprises slots allocation information for at least one of mobile stations in an uplink sub-frame and is stored in a downlink sub-frame.

10. The communication apparatus as claimed in claim 9, wherein the allocated transmitting burst is formed by a plurality of slots.

11. The communication apparatus as claimed in claim 9, wherein the slots allocation information for at least one of mobile stations is to indicate the number of slots is allocated for each of the mobile stations in the uplink sub-frame.

12. The communication apparatus as claimed in claim 11, wherein the plurality of parameters comprises a first slot location, a number of allocated slots, and an uplink sub-frame symbol duration of the transmission region.

13. The communication apparatus as claimed in claim 12, wherein the processing unit further decides a first symbol offset, a first sub-channel offset, a first number of symbols, and a first number of sub-channels in order to assign the first burst region.

14. The communication apparatus as claimed in claim 13, wherein the processing unit further decides a second symbol offset, a second sub-channel offset, a second number of symbols, and a second number of sub-channels in order to assign the second burst region.

15. The communication apparatus as claimed in claim 9, wherein the processing unit decides the transmitting region by merging the first burst region and the second burst region.

16. The communication apparatus as claimed in claim 9, wherein the processing unit decides the transmitting region by subtracting the second burst region from the first burst region.

17. A method for deciding a transmitting region for an allocated transmitting burst in a frame of an OFDMA system, comprising:
decoding via a decoder, an MAP message into a plurality of parameters, the MAP message relating to the allocated transmitting burst;
determining one or more than one necessary burst regions according to the parameters; and
deciding the transmitting region by merging one or more than one necessary burst regions;
wherein the MAP message is to indicate slot allocations for at least one of mobile stations in a uplink sub-frame and is stored in a downlink sub-frame;
wherein the plurality of parameters comprises a first slot location, a number of allocated slots, and an uplink sub-frame symbol duration of the transmitting region;
wherein each of one or more than one necessary burst regions is to describe with at least of a symbol offset, a sub-channel offset, a number of symbols, and a number of sub-channels according to the parameters.

18. A method for deciding a transmitting region for an allocated transmitting burst in a frame of an OFDMA system, comprising:
decoding via a decoder, an MAP message into a plurality of parameters, the MAP message relating to the allocated transmitting burst;
determining a desired burst region according to the parameters;
determining one or more than one unnecessary burst regions according to the parameters; and
deciding the transmitting region by subtracting one or more than one unnecessary burst regions from the desired burst region;
wherein the MAP message is to indicate slot allocations for at least one of mobile stations in a uplink sub-frame and is stored in a downlink sub-frame;
wherein the plurality of parameters comprises a first slot location, a number of allocated slots, and a uplink sub-frame symbol duration of the transmitting region;
wherein each of one or more than one unnecessary burst regions is to describe with at least of a symbol offset, a sub-channel offset, a number of symbols, and a number of sub-channels according to the parameters.

* * * * *